(12) United States Patent
Mishra (10) Patent No.: US 11,636,131 B1
(45) Date of Patent: *Apr. 25, 2023

(54) METHODS AND SYSTEMS FOR FACILITATING CONVERSION OF CONTENT FOR TRANSFER AND STORAGE OF CONTENT

(71) Applicant: Anilkumar Krishnakumar Mishra, Fremont, CA (US)

(72) Inventor: Anilkumar Krishnakumar Mishra, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,629

(22) Filed: Oct. 25, 2021

Related U.S. Application Data (63) Continuation-in-part of application No. 16/129,574, filed on Sep. 12, 2018, now Pat. No. 11,363,084, and a continuation-in-part of application No. 15/842,719, filed on Dec. 14, 2017, now Pat. No. 11,182,417.

(51) Int. Cl.
| | |
|---|---|
| G06F 16/30 | (2019.01) |
| G06F 16/25 | (2019.01) |
| G06F 40/49 | (2020.01) |
| G10L 15/26 | (2006.01) |
| G10L 13/08 | (2013.01) |
| G06F 40/253 | (2020.01) |

(52) U.S. Cl.
CPC ............ *G06F 16/258* (2019.01); *G06F 40/49* (2020.01); *G06F 40/253* (2020.01); *G10L 13/086* (2013.01); *G10L 15/26* (2013.01)

(58) Field of Classification Search
CPC ............................... G06F 16/50; G06F 16/258
USPC ........ 707/609, 687, 705, 769, 790, 813, 821
See application file for complete search history.

(56) References Cited

U.S. PATENT DOCUMENTS

| | | | |
|---|---|---|---|
| 6,947,162 | B2 | 9/2005 | Rosenburg et al. |
| 7,496,230 | B2 | 2/2009 | Chen et al. |
| 7,703,012 | B2 | 4/2010 | Park et al. |
| 2003/0037302 | A1 | 2/2003 | Dzienis |
| 2006/0015649 | A1 | 1/2006 | Zutaut et al. |
| 2006/0041840 | A1 | 2/2006 | Blair et al. |
| 2015/0287043 | A1* | 10/2015 | Michaelis .............. G16H 50/20 705/317 |
| 2016/0036962 | A1* | 2/2016 | Rand ................. H04M 1/72442 455/418 |

(Continued)

*Primary Examiner* — Sana A Al-Hashemi
(74) *Attorney, Agent, or Firm* — Kanika Radhakrishnan; Evergreen Valley Law Group (57) ABSTRACT

Various embodiments provide methods and devices for utilizing content conversion for the communication of content. In an embodiment, method, performed by a user device, includes receiving a user input comprising one or more user preferences to facilitate at least one output content; Further, the method includes receiving at least one input content from at least one content source based on the one or more user preferences. Thereafter, the method includes separating the at least one input content from the at least one content source using delimiters, and generating the at least one output content from the at least one input content based on one or more content characteristics. The at least one output content has data size less than the data size of the at least one input content. Furthermore, the method includes transmitting the at least one output content to another user device.

20 Claims, 6 Drawing Sheets

(56) References Cited

U.S. PATENT DOCUMENTS

2016/0065637 A1* 3/2016 O'Malley ............. H04L 65/612
  709/231
2018/0203851 A1* 7/2018 Wu ........................ G06F 16/50

* cited by examiner

METHODS AND SYSTEMS FOR FACILITATING CONVERSION OF CONTENT FOR TRANSFER AND STORAGE OF CONTENT

TECHNICAL FIELD

The present disclosure generally relates to digital content and, more particularly, to a method and device for facilitating conversion of content such as multimedia content based on user preferences for transfer and storage of content.

BACKGROUND

Generally, multimedia data includes a combination of audio, video and text (hereinafter collectively referred to as content). Content alteration/content substitution (hereinafter referred to as content conversion) of multimedia data provides new opportunities and benefits in connection with the distribution and storage of various derivative versions of an original work. For example, using content conversion technology, a person visiting a library may be enabled to read or hear a book in any language other than the one of his/her native language. As another example, a person may be enabled to watch his/her favorite celebrity or celebrities performing a song composed by the person himself/herself using content conversion technology. As another example, in a song, the voice(s) of the singer(s) can be substituted in part or full by the voice(s) of another singer(s). Additionally, the sound of musical instrument(s) can be substituted in part or full by the sound of another musical instrument(s). Currently available approaches for content conversion have limitations of providing single-ended conversions and isolation of the content up to only a certain extent.

Therefore, enhancing, extending, correcting, investigating, reproducing, substituting, and converting content based on user preferences by using electronic tools and methods would facilitate many more opportunities for social interactions, learning capabilities of human beings, and for transfer and storage of the content.

SUMMARY

Various embodiments of the present disclosure provide a method and device for facilitating content conversion for transfer and storage of multimedia content.

In an embodiment, a method includes receiving, by a user device, user input comprising one or more user preferences to facilitate at least one output content. The method further includes receiving, by the user device, at least one input content from at least one content source based on the one or more user preferences. Further, the method includes separating, by the user device, the at least one input content from the at least one content source into audio input, text input, and video input using delimiters. The delimiters are static or dynamic. The static delimiters are punctuation marks of human language and/or punctuation marks and tags of computer languages at any point of time. The dynamic delimiters are produced by artificially intelligent algorithms based on content and occurrence in the content. Thereafter, the method includes generating, by the user device, the at least one output content from the at least one input content based on one or more content characteristics. The one or more content characteristics are accessed from a plurality of content based library files for conversion of the at least one input content into the at least one output content. The at least one output content has data size less than the data size of the at least one input content. Furthermore, the method includes transmitting, by the user device, the at least one output content to another user device.

In another embodiment, a user device includes an I/O module and a communication module in communication with a processor. The I/O module is configured to receive a user input comprising one or more user preferences to facilitate at least one output content. The communication module is further configured to receive at least one input content from at least one content source based on the one or more user preferences. The processor is configured to separate the at least one input content from the at least one content source into audio input, text input, and video input using delimiters. The delimiters are static or dynamic. The static delimiters are punctuation marks of human language and/or punctuation marks and tags of computer languages at any point of time. The dynamic delimiters are produced by artificially intelligent algorithms based on content and occurrence in the content. The processor is further configured to generate the at least one output content from the at least one input content based on one or more content characteristics. The one or more content characteristics are accessed from a plurality of content-based library files for conversion of the at least one input content into the at least one output content. The at least one output content has data size less than the data size of the at least one input content. Further, the communication module is configured to transmit the at least one output content to another user device.

In yet another embodiment, a device includes an input module, a processing module and a transmitter connected with each other. The input module is configured to receive a user input comprising one or more user preferences to facilitate at least one output content. The input module is further configured to receive at least one input content from at least one content source based on the one or more user preferences. The processing module is configured to separate the at least one input content from the at least one content source into audio input, text input, and video input using delimiters. The delimiters are static or dynamic. The static delimiters are punctuation marks of human language and/or punctuation marks and tags of computer languages at any point of time. The dynamic delimiters are produced by artificially intelligent algorithms based on content and occurrence in the content. The dynamic delimiters are produced by artificially intelligent algorithms based on content and occurrence in the content. The processing module is further configured to generate the at least one output content from the at least one input content based on one or more content characteristics. The one or more content characteristics accessed from a plurality of content-based library files are used for conversion of the at least one input content into the at least one output content. The at least one output content has data size less than the data size of the at least one input content. The transmitter is configured to transmit the at least one output content to another user device.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various embodiments disclosed herein provide methods and devices for facilitating content conversion for transfer and storage of content. The electronic content or data is growing on earth and needs more and more resources, and consuming more and more power and energy. Using content conversion to save power, energy, bandwidth, and resources wherever possible in content reduction or content distribution.

More specifically, a user device is configured to receive input content from a variety of content sources. For example, the input content includes audio input, text input, video input and a combination thereof (i.e., multimedia input). The user device is configured to generate the output content from input content as per one or more user preferences. To achieve this, the user device is configured to include a plurality of content based library files such as audio library files, video library files, text library files, language conversion library files and the like. The library files are generated using a laboratory equipment (e.g., an artificial intelligent device). Each library file further includes one or more respective content characteristics. For example, the audio library files include one or more audio characteristics and so on. The one or more content characteristics are utilized by the user device to convert the input content to the output content. The output content includes audio output, text output, video output, and a combination thereof (i.e., multimedia output). Further, the user device is configured to transmit the output content to another user device. Various embodiments of the disclosure for facilitating content conversion are explained in detail herein with reference to FIGS. 1 to 5.

Figure 1:
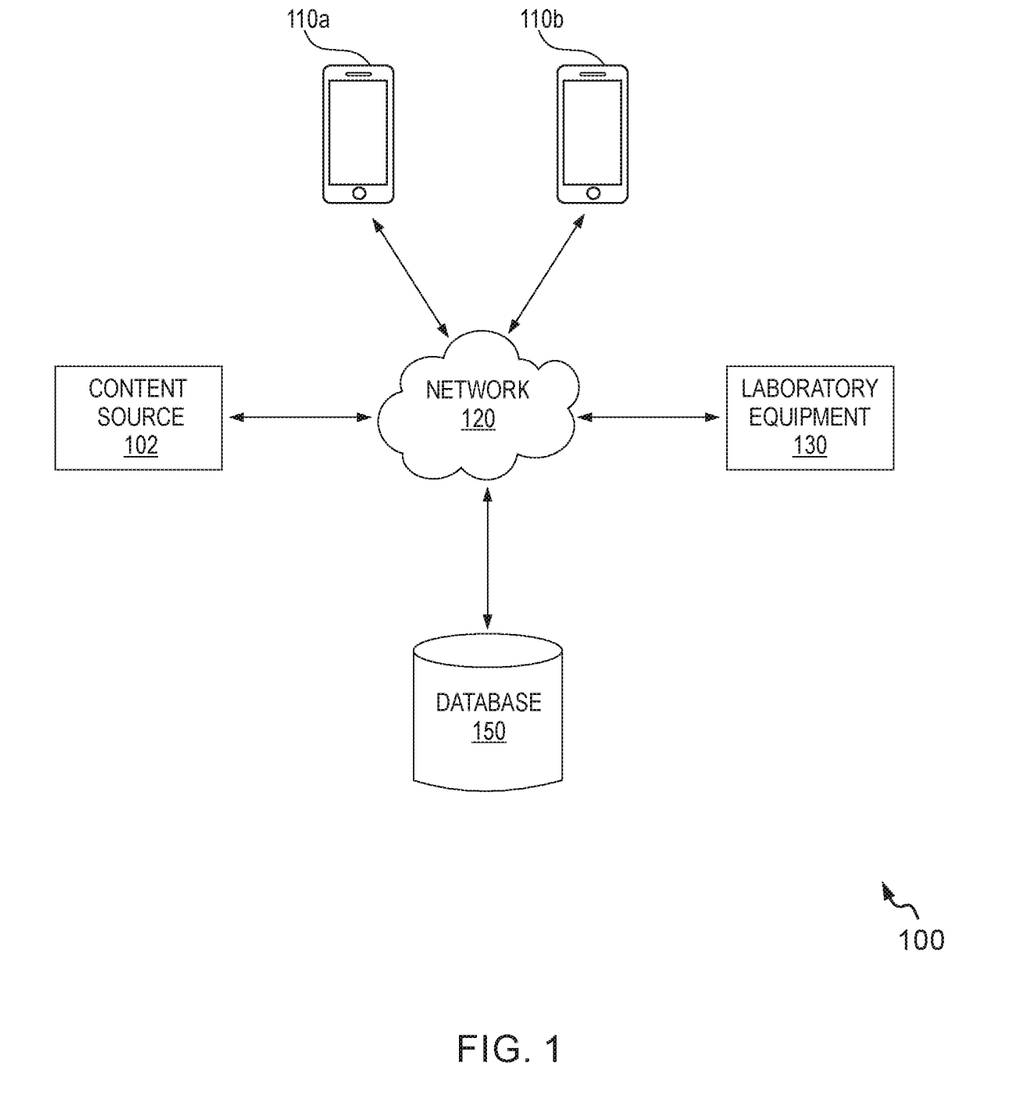
FIG. 1 illustrates an example representation of an environment related to at least some embodiments of the present disclosure.

FIG. 1 illustrates an example environment 100 related to at least some embodiments of the present invention. It should be understood that the environment 100, illustrated and hereinafter described, is merely illustrative of an arrangement for describing some example embodiments, and therefore, should not be taken to limit the scope of the embodiments. As such, it should be noted that at least some of the components described below in connection with the environment 100 may be optional and thus in some example embodiments may include more, less, or different components than those described in connection with the example embodiment of FIG. 1 or with subsequent FIGS. 2 to 5.

The environment 100 depicts a content source 102, database 150, laboratory equipment 130, and user devices 110a and 110b connected by a communication network such as a network 120. The content source 102 is an example of one or more electronic devices capable of providing at least one input content. Examples of input content include audio input, text input, video input and/or multimedia input. Some non-exhaustive examples of the content source 102 include a microphone, a Musical Instrument Digital Interface (MIDI), a media player, a digital camera, a camcorder, an image scanner, character scanner, a mobile phone, a webcam, a fingerprint scanner, a mechanical or touch keyboard, a touch screen, a digital pen, a stylus and the like. The user device 110 is an example of one or more electronic devices capable of providing at least one output content to a user. Examples of output content include audio output, text output, video output and/or multimedia output. Some non-exhaustive examples of the user device 110 include a mobile phone, a tablet computer, a laptop, a mobile computer, a personal digital assistant (PDA), a mobile television, and the like.

In an example embodiment, the user device 110 (such as user devices 110a and 110b) may be any communication device having hardware components for enabling a platform to be presented at the user devices 110a and 110b. The user devices 110a and 110b may be capable of being connected to a wireless communication network (such as the network 120).

The network 120 may be a centralized network or may include a plurality of sub-networks that may offer a direct or indirect communication using any existing transmission media between the user devices 110a and 110b, the content source 102, the database 150, and the laboratory equipment 130. For example, the network 120 may include wired networks, wireless networks and combinations thereof. Some non-limiting examples of wired networks may include Ethernet, local area networks (LANs), fiber-optic networks, and the like. Some non-limiting examples of wireless networks may include cellular networks like GSM/3G/4G/5G/LTE/CDMA networks, wireless LANs, Bluetooth, Wi-Fi or ZigBee networks, and the like. An example of the combination of wired and wireless networks may include the Internet.

In one embodiment, a user may be presented with one or more UIs (not shown) displayed on a display screen of the user device (not shown) to obtain a user input for facilitating at least one output content. The user may also be enabled to provide one or more user preferences according to which the output content is desired. The user preferences and the request for the output content are received by the user device. For example, the user may wish to convert his/her emails to audio emails when the user is unable to read them in scenarios such as while driving. Further, he/she may wish to reply to emails with speech and want it to be delivered as a document or speech or both at the receiving end. As another example, the user may wish to have a written document of the cooking instructions being given to the user, while cooking.

In at least one example embodiment, upon receiving the user preferences and the input content, the user device 110 is configured to utilize one or more relevant content characteristics from the plurality of content-based library files stored in the database 150 therein to facilitate the generation of the output content from the input content. To achieve this, the user device 110 may communicate with the database 150, and the database 150 may communicate with or include a laboratory equipment 130 that produces the content-based library files. It should be noted that the user device 110 can facilitate the generation of the at least one output content from the at least one output content in real-time as well as offline. Further, the user device 110 is configured to transmit the at least one output content to another user device. For example, the user device 110a transmits at least one output content to user device 110b. In an example, an audio message can be converted into a text message to reduce the data size of the content for transmission.

In one example embodiment, at the transmitter end (e.g., the user device 110a), the generation of the output content from the input content includes filtering out some of the characteristics of the input content using content based library files and artificial intelligent algorithms and based on the user preferences to reduce the size of the content. The data size of the output content to be transmitted is less than the data size of the input content. At the receiver end (e.g., the user device 110b), the filtered characteristics can be added back to the content received from the user device 110a to regenerate the input content of desired accuracy using content based library files and artificial intelligent algorithms based on the user preferences. In one example, the filtering out of some of the characteristics can be statistically agreed (i.e., predefined) initially between the user device 110a and the user device 110b such that no information is communicated related to the characteristics being filtered out. In another example, the filtering out of some of the characteristics can be dynamic and the user device 110a sends information related to the characteristics being filtered out to the user device 110b such that the user device 110b uses the information to regenerate the input content. The information related to the filtered out characteristics can be included in an additional library file referred to as content information file. The content information file is stored in the database 150 and can be retrieved by any user device. The format of the content information file is the same for static and dynamic scenarios.

In one example embodiment, undesired harmonic/frequency content or user-chosen harmonic/frequency content of the source can be filtered out from the input content at the user device 110a by utilizing the laboratory equipment 130 to generate the output content. The harmonic content to be filtered out can be statistically known between the user device 110a and the user device 110b ahead of time. The user device 110b may choose to add the filtered harmonic content back to the output content with desired energy to regenerate the input content. In another example, amplitude of output content signal can be reduced at the user device 110a and the gain factor can be known ahead of time to the user device 110b such that the user device 110b can amplify the signal to the same level or user-chosen level. In an embodiment, different colors in the input content can be combined at the user device 110a to form composite color content with a single color, and then the user device 110a transmits a composite color content signal to the user device 110b, the user device 110b separates the colors at its end by using established separation techniques. For example, one of the color separation techniques is similar to how white light can be passed through a prism to make a composite signal and if the same composite signal is passed through another prism, the other prism can separate white light into different colors.

In another example embodiment, at the transmitter end (e.g., the user device 110a), the generation of the output content from the input content includes conversion of the content from one format to another format using content-based library files and artificial intelligent algorithms and based on the user preferences to reduce the size of the content. Examples of the format may be audio format, video format, text format or any multimedia format. The conversion of the one format of the content to the other format will reduce size of content that in turn reducing bandwidth and resources needed to handle them, thus saving power and resources. The same conversion of content can be done to store the content on media thus reducing storage size, in turn saving storage resources and indirectly energy.

For example, as per the request of a user, a show recorded in the English language can be converted into French language and provided to the user for download. The user can download the show and watch it later on a user device, such as the user device 110a. In an example, a speech recorded in the English language can be converted into a text message before transmission for reducing the size of content to be transmitted. The text message can be converted into speech at the receiver end with the use of content-based library files. The various embodiments of the present disclosure, capable of facilitating content conversion, are explained hereinafter with reference to FIGS. 2-5.

Figure 2:
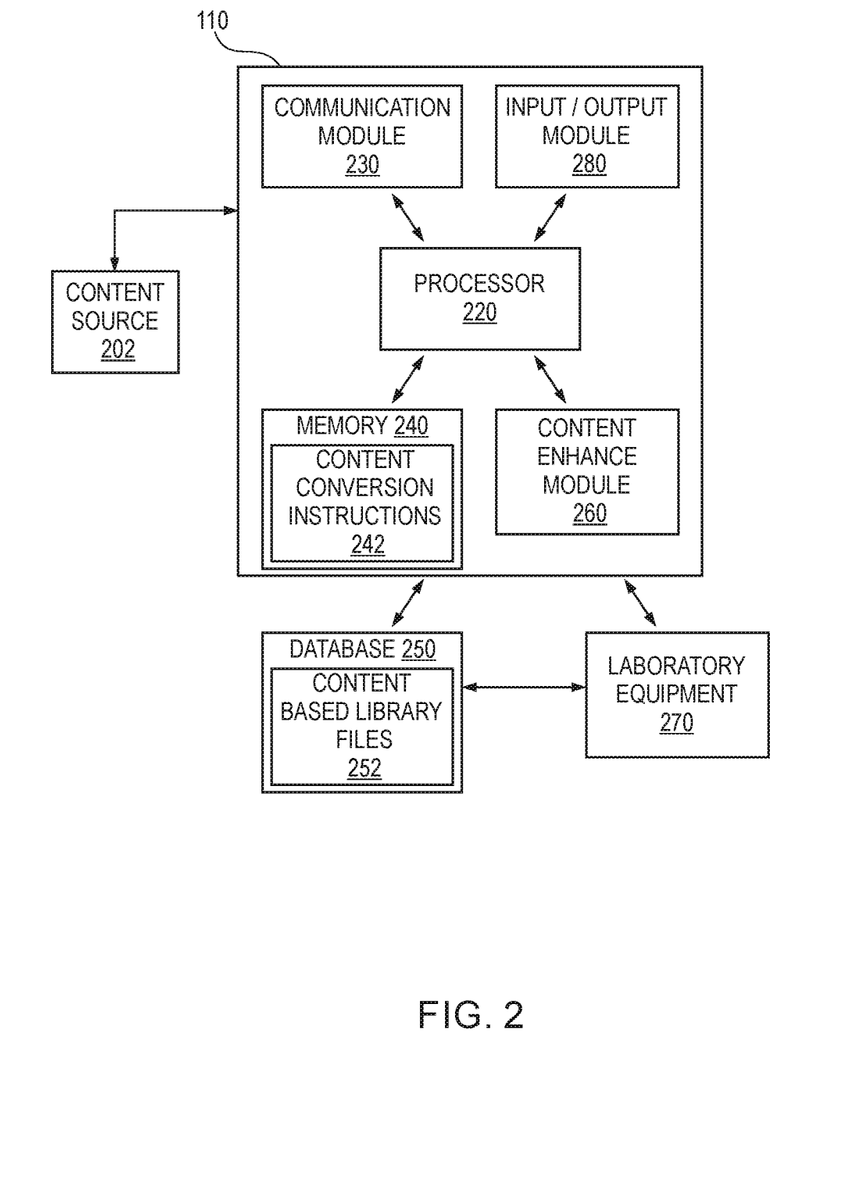
FIG. 2 illustrates a block diagram representation of a user device facilitating content conversion, in accordance with an example embodiment of the present disclosure.

FIG. 2 illustrates a block diagram representation of the user device 110 (such as user devices 110a and 110b) for facilitating content conversion, in accordance with an example embodiment of the present disclosure. The user device 110 is shown in communication with a content source 202 (such as the content source 102), a database 250 (such as the database 150), and laboratory equipment 270 (such as the laboratory equipment 130) over a communication network (such as the network 120 of FIG. 1).

In an example embodiment, the user device 110 includes at least one processor 220, a memory 240, a communication module 230, an input/output (I/O) module 280, and a content enhancer module 260 for facilitating content conversion. The processor 220 is operatively coupled with the memory 240, the communication module 230, the I/O module 280, and the content enhancer module 260.

The database 250 is any computer-operated hardware suitable for storing and/or retrieving data, such as but not limited to, a plurality of content based library files 252 (hereinafter referred to as content based library files 252), a plurality of user preferences, a plurality of content characteristics, a plurality of input contents, a plurality of output contents and the like. The database 250 may include multiple storage units such as hard disks and/or solid-state disks in a redundant array of inexpensive disks (RAID) configuration. The database 250 may include a storage area network (SAN) and/or a network attached storage (NAS) system. In some alternate embodiments, the database 250 may also include magnetic storage devices (such as hard disk drives, floppy disks, magnetic tapes, etc.), optical magnetic storage devices (e.g., magneto-optical disks), semiconductor memories (such as mask ROM, PROM (programmable ROM), EPROM (erasable PROM), Phase-change memory, flash ROM, RAM (random access memory)), etc. The user device 110 include one or more storage interfaces for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 220 with access to the database 250.

The processor 220 is capable of executing the stored machine executable instructions, hereinafter referred to as content conversion instructions 242 stored in the memory 240 of the user device 110. The processor 220 is configured to perform various operations. For example, the processor 220 may be configured to generate and transmit output content based on receiving user preferences from the user device 110 and input content from the content source 202 via the communication module 230. The processor 220 is further configured to utilize the content-based library files 252 stored in the database 250 for facilitating the conversion of the input content into the output content. The processor 220 may include one or more algorithms such as, but not limited to, speech to text algorithm, text to speech algorithm, speech recognition algorithm, face recognition algorithm, natural language processing algorithms, and the like to facilitate content conversion. The processor 220, in conjunction with the content enhancer module 260, is configured to facilitate signal conditioning and quality enhancement of the input content received from the content source 202 using the content-based library files 252. In an embodiment, the content enhancer module 260 is a part of the processor 220.

In an embodiment, the processor 220 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The laboratory equipment 270 (hereinafter referred to as lab 270) is configured to generate the library files 252. The lab 270 is user-configurable for producing library files 252 with various degrees of precision and accuracy. In one embodiment, the lab 270 is an artificial intelligent device supported by human intelligence through manual editing mode and is made up of digital and analog hardware, processing signals in digital and analog domains. The lab 270 can be interfaced/connected with all input-output devices (e.g., the content source 202 and user devices 110$a$ and 110$b$) over wired or wireless networks such as the network 120 of FIG. 1. Further, the lab 270, can exist remotely outside the user device 110 as per the need and depending upon cost, precision, accuracy desired, and any other human deciding factors.

The memory 240 may be configured to store the content conversion instructions 242 for the processor 220 to execute for facilitating content conversion. The memory 240 is a storage device embodied as one or more volatile memory devices, one or more non-volatile memory devices, and/or a combination of one or more volatile memory devices and non-volatile memory devices, for storing micro-contents information and instructions. The memory 240 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash ROM, RAM (random access memory), etc.).

The communication module 230 is configured to facilitate communication between the user device 110, the content source 202, the lab 270, and the database 250. In one embodiment, the communication module 230 is configured to receive the input content. In one embodiment, the communication module 230 includes a transceiver for wirelessly communicating information to, or receiving information from, the content source 202 or the user device 110$b$. In another embodiment, the communication module 230 is capable of facilitating operative communication with the remote devices and a cloud server using API (Application Program Interface) calls. The communication may be achieved over a communication network (such as the network 120 of FIG. 1).

In at least one example embodiment, the user device 110 may include an Input/output module (I/O module) 280 configured to receive inputs from and provide outputs to the user of the user device 110. To that effect, the I/O module 280 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light-emitting diode display, a thin-film transistor (TFT) display, a liquid crystal display, an active-matrix organic light-emitting diode (AMOLED) display, etc.), a speaker, a ringer, a vibrator, and the like.

Figure 3:
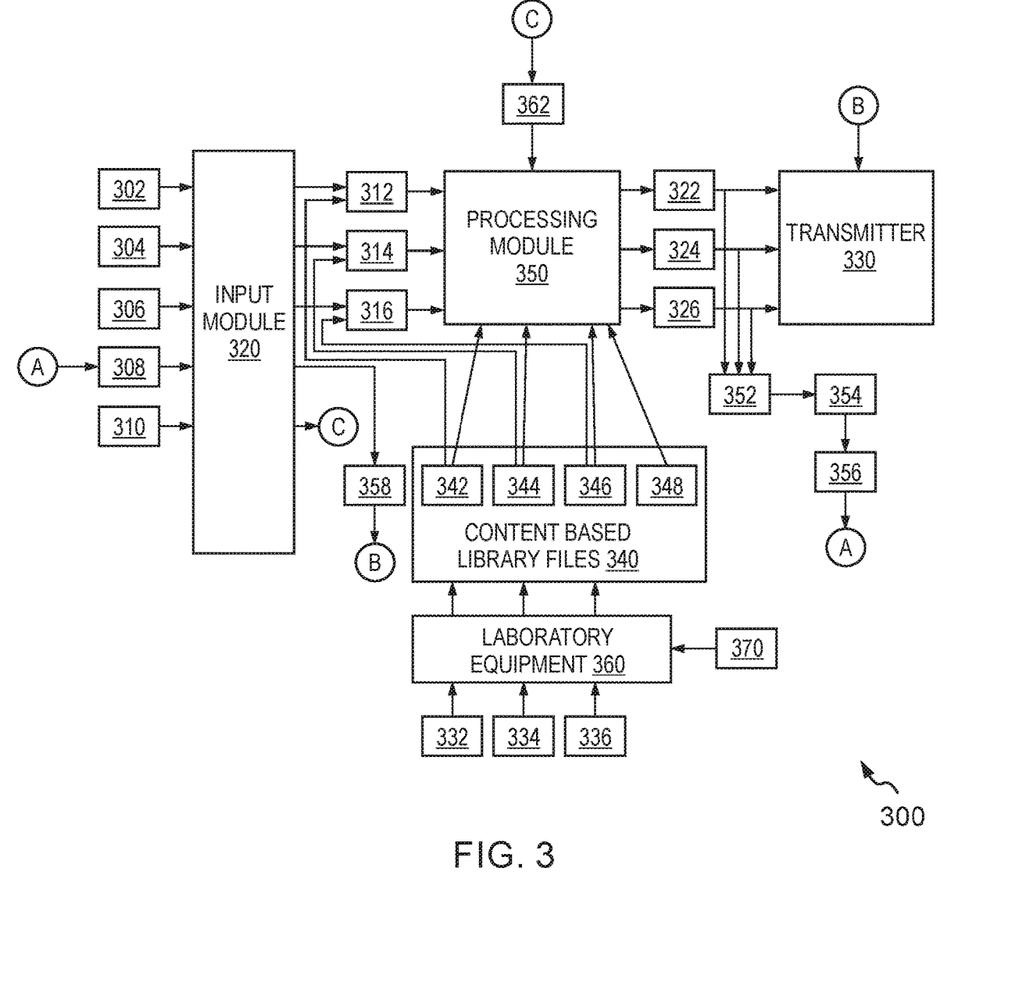
FIG. 3 shows a block diagram of another representation of a device facilitating content conversion, in accordance with an example embodiment of the present disclosure.

FIG. 3 shows a block diagram of user device 110 (hereinafter referred to as device 300) for facilitating content conversion, in accordance with an example embodiment of the present disclosure. In at least one embodiment, the device 300 includes an input module 320, a receiver (may also be a part of the input module 320 and not shown in FIG. 3), a processing module 350, a plurality of content based library files 340 (hereinafter alternatively referred to as library files 340) and a transmitter 330.

The input module 320 is configured to receive a user input (see, box 310) including one or more user preferences provided by a user to facilitate output content. The input module 320 communicates with one or more content sources (see, boxes 302, 304, 306, and 308) configured to provide input content based on the one or more user preferences. For example, an audio source 302 is configured to provide an audio input. A text source 304 is configured to provide a text input. A video source 306 is configured to provide a video input. A multimedia source 308 is configured to provide a multimedia input to the device 300. The input content can be stored input content, content that is captured in real-time, or the content accessed or streamed from other locations. For example, a stored text input file (e.g., received from the text source 304) may be in a soft copy on a Computer Disc (CD), a Universal Serial Bus (USB) drive, or any other storage devices, or may be downloaded from the Internet and the like or a hard copy printed on a paper drawn/written by human being or machines, in any language. The input module 320 may include at least one input device. Examples of the input device may include, but are not limited to, a keyboard, a mouse, a joystick, a keypad, a touch screen, soft keys, a microphone, a camera, a scanner, and the like.

In one embodiment, the library files 340 may correspond to content based library files 252 stored in the database 250 of FIG. 2. The library files 340 further include audio library files 342, text library files 344, video library files 346, and language conversion library files 348 stored in the device 300 for use by the processing module 350. In one embodiment, the audio library files 342 include one or more audio characteristics, text library files 344 include one or more text characteristics, video library files 346 include one or more video characteristics and the language conversion library files 348 include one or more language characteristics. Library files 340 are generated using a laboratory equipment 360 (hereinafter referred to as lab 360). Lab 360 may correspond to lab 270 of FIG. 2. In one embodiment, the lab 360 receives audio input in any format from an audio source 332 for defining the audio characteristics as per the user preferences to generate the audio library files 342. Similarly, lab 360 receives text input in any format from a text source 334 for defining the text characteristics as per the user preferences to generate the text library files 344. Further, lab 360 receives video input in any format from a video source 336 for defining the video characteristics as per the user preferences to generate the video library files 346. In one embodiment, the lab 360 may also include necessary files/sources for defining language conversion characteristics to generate language conversion library files 348. In some embodiments, the input content received from the content sources 302, 304, and 306 may be the input content received from the content sources 332, 334, and 336, respectively, by the lab 360 for generating the audio library files 342, text library files 344 and video library files 346.

In one embodiment, the lab 360 is configured to receive inputs from a manual editor 370. More specifically, the lab 360 is user-configurable for producing library files 340 of various degrees of precision and accuracy using the manual editor 370. In one embodiment, the lab 360 and the manual editor 370 can be remotely located in a server and be capable of producing desired library files 340.

In one embodiment, the language conversion library files 348 may be used by the processing module 350 (e.g., processor 220 of user device 110) for converting audio input, text input and video input into a plurality of different languages as per user preferences. For example, one language can be converted to another language straightforward with grammar and vocabulary. Alternatively, one language can be converted to another language through a bridge language/intermediate language. Criteria for the selection of intermediate language may include, for example, a superset of vocabulary and grammar of a plurality of different languages. For example, Chinese can be converted to an intermediate language English, which can be converted into other target languages such as Spanish or French. It is noted that there can be multiple intermediate languages between source and target languages and they can be user-configurable as well. Further, bridge/intermediate languages can be built to convert the texts of sentences with higher lengths to equivalent condensed form.

In an embodiment, the library files 340 may be sophisticated as per daily usage of the device 300 by updating new input content on a periodic basis for later use. In addition to characterization, the library files 340 can be edited. The library files 340 can be put in a learning mode algorithm, which can learn and enhance library files 340 by learning from stored data or live data being received from various content sources (such as the content sources 332, 334, and 336). Further, the library files 340 may be improved/enhanced through algorithms that use best-benchmarked data to improve/enhance the library files 340. It is noted that the library files 340 may or may not co-exist in the device 300 and may be received from various sources such as the remotely located lab 360 using a communication module 354 depending upon factors such as need, accuracy, sophistication, and the like. In one embodiment, the library files 340 can go through algorithms of self-learning based on iterative minimization of error of actual output with respect to desired output through a feedback mechanism. The feedback mechanism may be machine-based and/or human-based (i.e., receiving feedback from users of the device 300). In one embodiment, the library files 340 that are generated for and from the content, using lab 360 involves processing in analog and digital domain signal processing. The library files 340 generated using intelligent algorithms, can be used to build various models for content such as mathematical models, mechanical models, and electro-mechanical models. These models can be built with or without user interventions. These models can be used for content regeneration/reproduction. For example, a vocal cord tract model for living beings (human and animals), instrument sound models, dimensional models, etc. can be made from content-based library files.

The device 300 further includes a plurality of other modules such as an audio enhancer 312, a text enhancer 314, a video enhancer 316, an output combiner 352, the communication module 354, a content separator 358, a user configuration module 362, a manual modifier 364 and the like. In one embodiment, the audio enhancer 312, the text enhancer 314, and the video enhancer 316 may functionally correspond to the content enhancer module 260 of the user device 110 of FIG. 2. In an example, the audio enhancer 312 is configured to receive the audio input from the audio source 302. The audio enhancer 312 is configured to provide signal conditioning and processing of the audio input in analog and digital formats and domains. In an example, the audio enhancer 312 also receives input from the audio library files 342, which contains the audio characteristics, to improve the quality of the received audio input.

The text enhancer 314 is configured to receive text input from the text source 304. The text enhancer 314 also includes required hardware and/or software such as a reader for soft copy files and a scanner to read hardcopy files. Using text library files 344, the text enhancer 314 improves the quality and understanding of the text input received from the text source 304.

The video enhancer 316 is configured to receive video input from the video source 306. The video enhancer 316 is configured to provide signal conditioning and processing of the video input. The video enhancer 316 also receives input from the video library files 346 which contains the video characteristics to improve the quality of the video input.

In one embodiment, the user may provide the user preferences using an input interface of the input module 320. The user preferences may be sent to the user configuration module 362 which is further configured to forward them to the processing module 350. Depending upon user preferences received from the user configuration module 362, the processing module 350 is configured to perform one or more actions. The processing module 350 receives input content from the audio enhancer 312, text enhancer 314 and the video enhancer 316. The processing module 350 is further configured to receive inputs in terms of one or more relevant content characteristics from the audio library files 342, the text library files 344, the video library files 346, and the language conversion library files 348 generated by the lab 360. The processing module 350 is configured to generate the output content from the input content utilizing the content characteristics accessed from the library files 340.

In one embodiment, the processing module 350 is configured to execute one or more algorithms such as, but not limited to, text to speech algorithm, speech to text algorithm, language conversion algorithm, facial recognition algorithm, voice recognition algorithm, and the like. Further, the processing module 350 is configured to receive either audio input, text input, video input, or a combination thereof, and it has the capability to produce an audio output 322, a text output 324, and a video output 326. Further, the output content (e.g., the audio output 322, the text output 324, and the video output 326) can be generated in any language using the language conversion library files 348.

In one embodiment, the processing module 350 is configured to generate the output content from the input content by filtering out some of the characteristics of input content using content based library files and artificial intelligent algorithms and based on the user preferences to reduce the size of the content. In one example, the filtering out of some of the characteristics can be statistically agreed (i.e., pre-defined) initially between the device 300 and another user device (i.e., user device 110b) such that no information is communicated related to the characteristics being filtered out. In another example, the filtering out of some of the characteristics can be dynamic and the processing module 350 sends information related to the characteristics being filtered out to the user device 110b such that the user device 110b uses the information to regenerate the input content. The information related to the filtered out characteristics can be included in an additional library file referred as content information file. The content information file is stored in a database and can be retrieved by any user device. The formation of the content information file is the same for static and dynamic scenarios.

In one example embodiment, the processing module 350 is configured to filter out undesired harmonic/frequency content or user-chosen harmonic/frequency content of the source from the at least one input content at the device 300 by utilizing the lab 360. The harmonic content to be filtered out can be statistically known between the device 300 and the other user device 110b ahead of time. The other user device 110b may choose to add the filtered harmonic content back to the at least one output content with desired energy. In another example, amplitude of the at least one output content signal can be reduced by the processing module 350 and the gain factor can be known ahead of time to the other user device 110b such that the other user device 110b can amplify the signal to the same level or user-chosen level. In an embodiment, different colors in the input content can be combined by the processing module 350 to form composite color content with single color, and then the transmitter 330 transmits a composite color content signal to the other user device 110b, the other user device 110b separates the colors at its end by using established separation techniques. For example, one of the color separation techniques is similar to how white light can be passed through a prism to make a composite signal and if the same composite signal is passed through another prism, the other prism can separate white light into different colors.

In another example embodiment, the processing module 350 is configured to generate the output content from the input content by conversion of the content from one format to another format using content library files and artificial intelligent algorithms and based on the user preferences to reduce the size of the content. Examples of the format may be audio format, video format, text format, or any multimedia format. This will reduce the size of content hence bandwidth and hence resources needed to handle them are reduced, thus saving power and resources. The same can be done to store content on storage media thus reducing storage size, in turn saving storage resources and indirectly energy.

The transmitter 330 is configured to transmit the generated output content either over legally allowed radio frequencies or as a stream over the internet/intranet. An example of the transmitter 330 can be a wired or wireless intranet and/or internet. Another example of the transmitter 330 can be a radio frequency modulator and amplifier that can transmit content over legally allowed radio frequencies. The transmitter 330 can also take the example of any other device that can be used to send content by any suitable communication medium so that the content can be received by a receiver. In practical examples, the transmitter 330 can also transmit different converted content as different streams on the internet/intranet and the receiver can receive these streams selectively through the internet/intranet. As an example, one can only download audio content from an online available movie or news or any other multimedia content, stored on a server, in same or any other language of choice either in audio or text form. The same is applicable for live transmission through any media of transmission.

It is understood that all the interfaces of the device 300 can be built into the device 300 or can be attached to the device 300 via wired or wireless connections. This allows the device 300 and the interfaces to be remotely located. For example, camera, microphone, display screen, speaker etc.

In an embodiment, the output combiner 352 is configured to combine the audio output 322, text output 324, and the video output 326 generated by the processing module 350. The output combiner 352 is further configured to convert the output content in a proprietary format. This proprietary format may have associated abilities/utilities to convert back and forth from the commercially available formats e.g., Microsoft Word and the like. The combined output format may use a storage efficient compression algorithm (for example, a zip file) while storing the content in the memory of the device 300 before sending it to the transmitter 330 or to a remote device such as the remote device 356 (for example, user device 110b in FIG. 1). The remote device 356 may be any electronic device with communication capabilities including the user device associated with the user.

The communication module 354 may include mechanisms configured to receive inputs from and provide outputs to the remote device 356. The communication module 354 may include a transceiver for wirelessly communicating information to, or receiving information from, the remote device 356. In one embodiment, the remote device 356 may be a user device (e.g., user device 110b of FIG. 1). In other embodiments, the remote device 356 may be an example of user device 110*b* of FIG. 1, which is capable of receiving the output content from the user device 110*a* of FIG. 1 and processing the output content to regenerate the output content.

In one embodiment, the input module 320 of the device 300 is configured to receive multimedia input from the multimedia source 308 in order to generate the multimedia output or separate output files based on user preferences received from the user configuration module 362.

In one embodiment, the content separator 358 is capable of separating the multimedia input received from the multimedia source 308 and then facilitating it on the output module 330. In one embodiment, the audio, video, and text input may be separated from each other (i.e., the multimedia input) using delimiters between each of them. The delimiters can be static or dynamic. The static delimiters are punctuation marks of human language and/or punctuation marks and tags of computer languages at any point in time. They also include various content separators of content stored on optical/magnetic/semiconductor storage devices/media. Artificially intelligent algorithms can also produce dynamic delimiters based on content and their occurrence in content. As an example, pause or silence in sound content can be a delimiter, white space in hard copy or soft copy document can be a delimiter, any repetitive content can be a delimiter. Each of audio/video/text inputs and the library files 340 may use its own storage algorithm which may further be mentioned in the respective information header of each input/file. For example, each of them may have two separate storage locations identified by specific names such as the information section and data section. The information section may provide information about the data section. In one embodiment, there may also be present the manual modifier 364 that provides the facility to manually edit the audio, text, and video at various stages while being processed by the processing module 350 to generate the output content. It is understood that the device 300 or the user device 110 are configured to obtain authorization from a plurality of entities in order to generate the output content. For example, if a celebrity voice is to be used as an input content, corresponding authorization from the celebrity needs to be obtained before using his/her voice.

In one example embodiment, the device 300 is configured to process audio input received from one or more audio sources (e.g., the audio source 302 being an in-built microphone of the device 300). The audio input can be synthesized using the device 300 or substituted by the device 300. The device 300 is capable of facilitating substitution of songs, musical performances (stored or captured in real-time), musical instruments used in those performances, animal sounds and the like using the audio characteristics accessed from the audio library files 342. For example, identifying and substituting musical instrument in a song i.e., Indian instrument 'Tabla' being substituted by 'Drum' sound in a song. The audio library files 342 may already have sounds of various musical instruments stored therein to facilitate such substitution. As another example, the processing module 350 may utilize speech to text algorithm, the language conversion library files 340, and text to speech algorithm in sequence to produce original speech/song in multiple languages as per user preferences. Further, the audio library files 342 may also be configured to generate a new song or speech using stored audio characteristics. It is noted that the audio characteristics may be recorded as time-domain (such as amplitude, speed, the direction of the sound, etc.) and frequency domain (such as fundamental frequency and harmonic frequency contents of audio input or amplitude of these fundamental and harmonic frequencies) characteristics in various embodiments.

In another example embodiment, the audio characteristics may also be used for sound quality enhancement in communication systems that distort original transmitted sound due to noise in transmission media. At the receiving end of the transmission line of the communication system, by identifying sound with respect to stored sound, the quality of distorted received sound can be enhanced/improved or selectively substituted for better audio quality by the processing module 350. This feature may further be applied to audio files stored on various media devices that get corrupted or distorted due to various reasons such as aging, degradation of material used for storing, and the like to provide quality enhancement. Additionally, enhancement in audio quality may involve audio to text conversion and then from the converted text back to audio conversion.

In one example embodiment, the input module 320 may be configured to include a writing pad (screen) with a stylus (e.g., the text source 304) for enabling the user to write/draw using a stylus to provide text input to the device 300 in a handwritten/drawn format. The text library files 344 may be configured to determine text characteristics that may be used by the processing module 350 to enhance/convert the text input being written/drawn to a text output or other form of the output as per user preferences. For example, pressure with which user writes with stylus/pen on the writing pad, speed of writing/drawing, color selection to write/draw, other activities performed using the pad and the like may be used by the processing module 350 to analyze and determine various features of the text input.

For example, for a written document, using the characteristics such as pressure, speed of writing, the content of the writing, and style of writing, the processing module 350 may be configured to analyze human nature and may further be able to associate with the voice of the user. In an example scenario, if the written document is to be converted to an audio form in a specified language in the voice of the user who is writing the document, and if the audio library files 342 already include the user's voice, the processing module 350 may fetch the relevant file and produce the desired output. In various embodiments, a keyboard input using mechanical keys or touch screen, various types of page scanners or character scanners, images of the document captured by the camera, etc., may also be detected by the device 300 to determine various characteristics of the document. The output content generated using the document with all the information can be stored inside the device 300 or can be sent to the remote device 356 connected to the device 300 via wired or wireless connections.

In one example embodiment, the video source 306 may be capable of providing any form of video input stored or captured in real-time. Some non-exhaustive examples of the video source 306 include cameras such as Digital Single-Lens Reflex (DSLR), camcorder, movie cameras, and the like. In one embodiment, audio associated with video input may be handled by the audio enhancer 312 and processed by the processing module 350 using the audio characteristics as explained hereinabove. The video library files 346 are configured to provide the video characteristics such as identifying various parts of the human body by monitoring leg movement, facial expression, hand movement, steps size, sitting posture, angle, speed of walking, and the like. For a real-time, scenario, a user can himself/herself characterize different physical expressions and the same can be processed by the processing module 350 to generate the desired output content. In one embodiment, the camera of the device 300 may be configured to listen to audio, record video, capture images or other interactions that are within the field of view to identify people, objects, and other relevant content. This may be sent to the video library files 346 to further characterize various non-living aspects of the video input such as rivers, mountains, and the like. This characterized data can be used by the processing module 350 to generate a different video output (movie scene) using only a portion of the original content.

Figure 4:
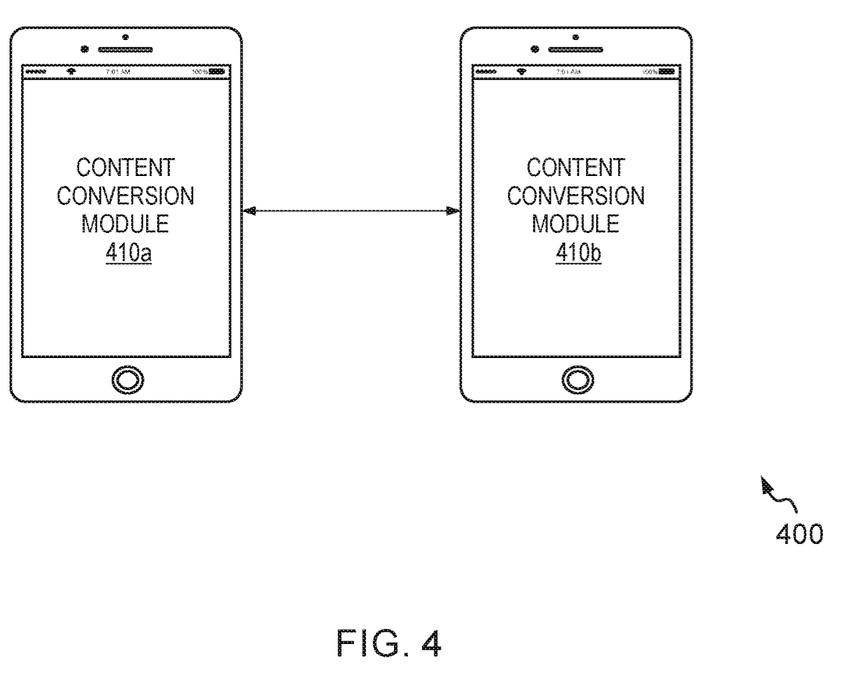
FIG. 4 shows a simplified representation of the communication between two user devices utilizing content conversion in an example scenario, in accordance with an example embodiment of the present disclosure.

FIG. 4 shows a simplified representation 400 communication between two user devices 110*a* and 110*b* (such as user device 110 in FIG. 2 and device 300 of FIG. 3) utilizing content conversion in an example scenario, in accordance with an example embodiment of the present disclosure. The representation 400 includes an example scenario, where the user device 110*a* is the transmitter and the user device 110*b* is the receiver. Both the user devices 110*a* and 110*b* include a content conversion module 410*a* and 410*b* shown in FIG. 4. In one embodiment, the user device 110*a* can be trained to generate the output content from input content and transmit the output content. In one embodiment, the user device 110*b* can be trained to receive the output content and regenerate the input content from the output content using library files.

Figure 5:
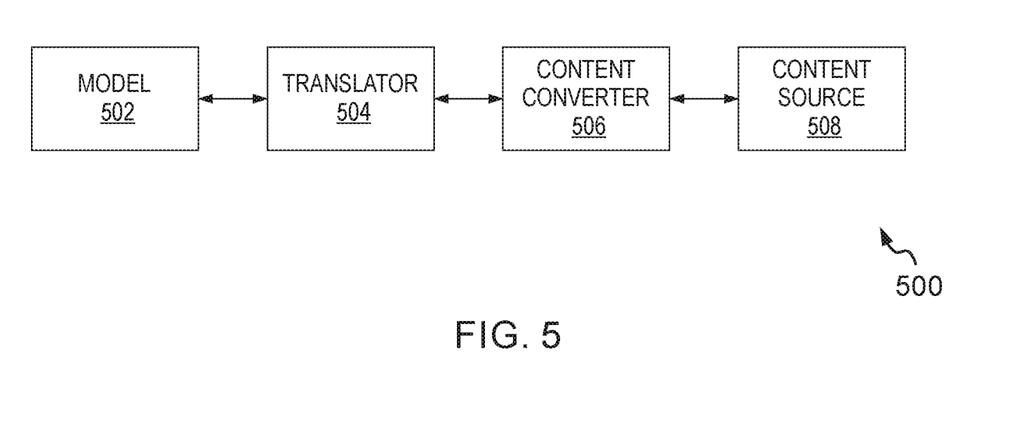
FIG. 5 illustrates a block diagram representation of a system for the creation of a model using content conversion, in accordance with an example embodiment of the present disclosure.

FIG. 5 shows a block diagram of a system 500 for the creation of a model 502 using content conversion, in accordance with an example embodiment of the present disclosure. The system 500 includes a translator 504 that is configured to translate the language of content from a content converter 506 (similar to user device 200 and device 300). In an example embodiment, content based library files (such as library files 340) are generated using intelligent algorithms in the content converter 506. The content-based library files are generated from content received from content source 510 (similar to content source 102, 202). The content-based library files can be used to build various models (similar to the model 502) for content such as mathematical models, mechanical models, and electro-mechanical models. These models can be built with or without user interventions. These models can be used for content regeneration/reproduction. The models can be refined or updated by the content converter 506 using the content from the content source 510. For example, a vocal cord tract model for living beings (human and animals), instrument sound models, dimensional models, etc. can be made from content-based library files. The mathematical models are built using various mathematical formulas, equations, and algorithms, for time and frequency domains and using real or complex numbers. Examples of mathematical models include models produced using Fourier transform, Fast Fourier transform (FFT), Discrete Fourier Transform (DFT), Laplace transform models. Examples of mechanical models include 3D models from different images, and electromechanical models include the vocal cord model) which can be built using content converter 506. The content converter 506 and the translator 504 can be configured to convert the entire content from content source 510 in a model form. For example, an audio content can be converted into a mathematical equation in time and frequency domains, and the equations can be used to store and or/transfer and recreate the audio content. In an example embodiment, the translator 504 may be a part of the content converter 506. Further, the content converter 506 can be configured to convert the content-based library files and/or the content from the content source 510 in a model form. The model form of content-based library files and/or content can be used to store or distribute and used in the content conversion and/or recreation of the content from the model form. The model form may include content in the form of mathematical equations, 3D mechanical models and electromechanical models, etc.

Figure 6:
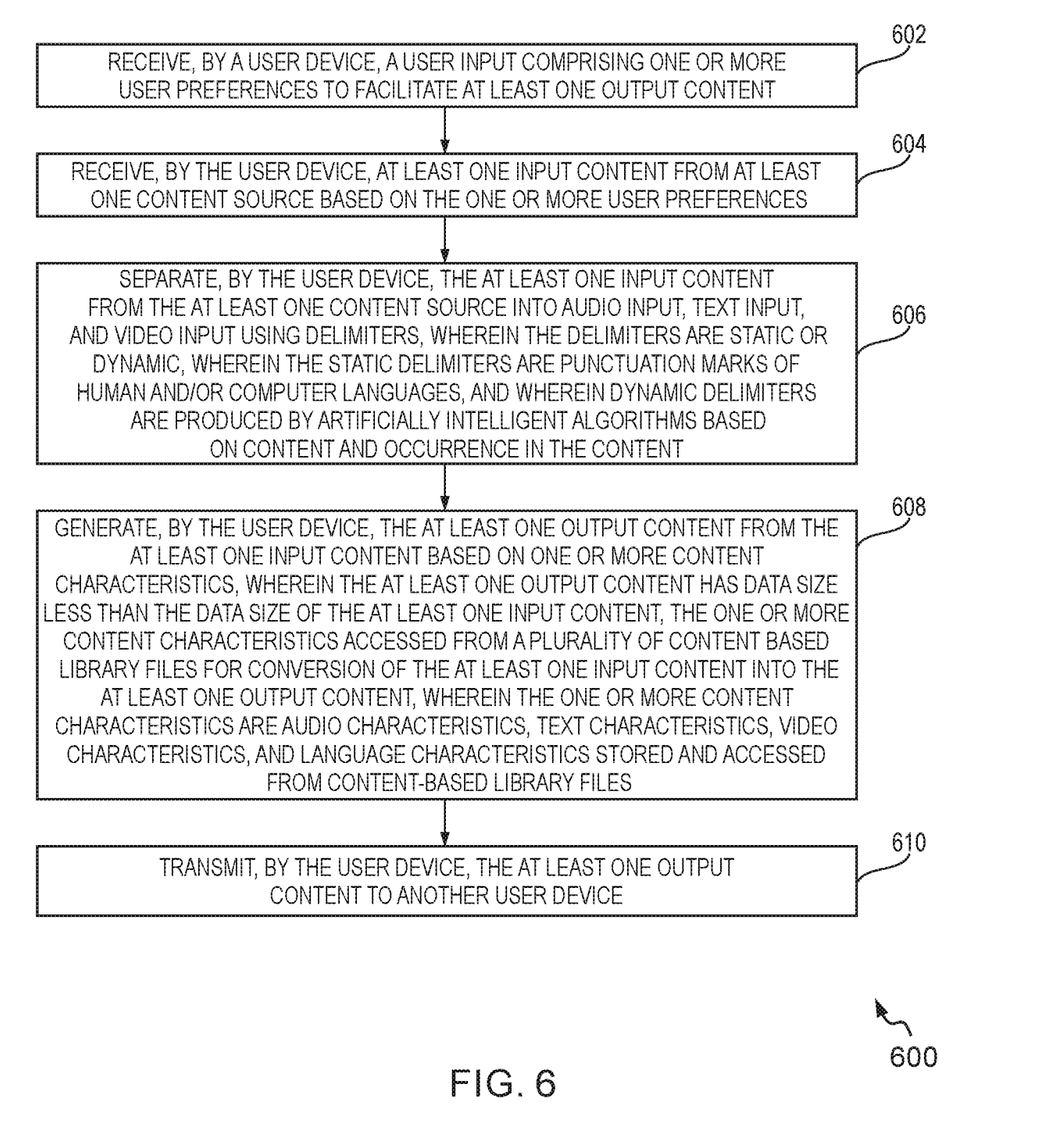
FIG. 6 is a flow diagram of a method for facilitating content conversion for transfer of content, in accordance with an example embodiment of the present disclosure.

FIG. 6 is a flow diagram of a method 600 for facilitating content conversion, in accordance with an example embodiment of the present disclosure. The various steps and/or operations of the flow diagram, and combinations of steps/operations in the flow diagram, may be implemented by, for example, hardware, firmware, a processor, circuitry, and/or by the user device 110 of FIG. 2, and/or by the device 300 of FIG. 3 and/or by a different electronic device associated with the execution of software that includes one or more computer program instructions.

At 602, a user input from a user is received by the user device 110 of FIG. 2. The user input includes one or more user preferences to facilitate at least one output content based on the one or more user preferences. For example, the user may wish to convert a song in his/her preferred language associated with music to a written document. In one embodiment, the user preferences may further include a level of accuracy desired in the output content, the format of output content, enabling bridge language conversion while document conversion from one language to another language, preferences related to bridge languages to be used, the other user device on which the output content is desired to be received, and the like.

At 604, at least one input content is received from at least one content source based on the one or more user preferences. The user device is configured to receive audio input, text input, video input, or multimedia input from the respective content sources. In one embodiment, the input content may be conditioned in terms of quality improvement by at least one content enhancer module 260 such as the audio enhancer 312, the text enhancer 314, and the video enhancer 316 of FIG. 3 before generating the output content as per the user preferences.

At 606, the at least one input content from the at least one content source is separated into the audio input, text input, and video input using delimiters. The delimiters are static or dynamic, the static delimiters are punctuation marks of human and/or computer languages, and the dynamic delimiters are produced by artificially intelligent algorithms based on content and occurrence in the content.

At 608, the at least one output content is generated from the at least one input content based on one or more content characteristics. The one or more content characteristics are accessed from a plurality of content-based library files for conversion of the at least one input content into the at least one output content. In one embodiment, the content characteristics are stored as digitized data organized as objects of a class into each library file. The library files 340 are generated by laboratory equipment (such as lab 130/lab 270/lab 360). In an embodiment, the generation of the at least one output content from the at least one input content includes filtering out some of the characteristics of at least one input content using content library files and artificial intelligent algorithms and based on the user preferences to reduce the size of the content. The data size of the at least one output content to be transmitted is less than the data size of the at least one input content. At a receiver device (e.g., the user device 110*b*), the filtered characteristics can be added back to the at least one output content received from the user device 110*a* to regenerate the at least one input content of desired accuracy using content library files and artificial intelligent algorithms based on the one or more user preferences. In one example, the filtering out of some of the characteristics can be statistically agreed (i.e., predefined) initially between the user device 110a and the user device 110b such that no information is communicated related to the characteristics being filtered out. In another example, the filtering out of some of the characteristics can be dynamic and the user device 110a sends information related to the characteristics being filtered out to the user device 110b such that the user device 110b uses the information to regenerate the at least one input content. The information related to the filtered out characteristics can be included in an additional library file referred as content information file. The content information file is stored in a database and can be retrieved by any user device. The format of the content information file is same for static and dynamic scenarios.

In one example embodiment, the generation of the at least one output content from the at least one input content includes filtering out undesired harmonic/frequency content or user chosen harmonic/frequency content of the source from the at least one input content at the user device 110a by utilizing the laboratory equipment 130. The harmonic content to be filtered out can be statistically known between the user device 110a and the user device 110b ahead of time. The user device 110b may choose to add the filtered harmonic content back to the at least one output content with desired energy. In another example, the generation of the at least one output content from the at least one input content includes reducing the amplitude of a signal including the at least one input content at the user device 110a, and gain factor can be known ahead of time to the user device 110b such that the user device 110b can amplify the signal to the same level or user-chosen level. In an embodiment, the generation of the at least one output content includes combining different colors in the at least one input content at the user device 110a to form composite color content with a single color and then the user device 110a transmits composite color content signal to the user device 110b, the user device 110b separates the colors at its end by using established separation techniques. For example, one of the color separation techniques is similar to how white light can be passed through a prism to make a composite signal and if the same composite signal is passed through another prism, the other prism can separate white light into different colors.

In another example embodiment, the generation of the at least one output content from the at least one input content includes conversion of content from one format to another format using content library files and artificial intelligent algorithms and based on the user preferences to reduce the size of the content. Examples of the format may be audio format, video format, text format or any multimedia format. This will reduce the size of content hence bandwidth and hence resources needed to handle them, thus saving power and resources. The same can be done to store content on media thus reducing storage size, in turn saving storage resources and indirectly energy.

At 610, at least one output content is transmitted to another user device (such as user device 110b in FIG. 1). The information related to the characteristics being filtered out is transmitted to the user device 110b before the transmission of the at least one output content such that the user device 110b uses the information to regenerate the at least one input content. The information related to the filtered out characteristics can be included in an additional library file referred as content information file. In one example, the content information file is stored in a database and can be retrieved by any user device. The format of the content information file is the same for static and dynamic scenarios. As an example, one can only download audio content from an online available movie or news or any other multimedia content, stored on a server, in the same or any other language of choice either in audio or text form. The same is applicable for live transmission through any media of transmission.

The disclosed method 600 or one or more operations of the method 600 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Various example embodiments offer, among other benefits, techniques for establishing system, device and method for utilizing content conversion in communication between two user devices and thereby enhancing user experience, increasing social interactions and learning capabilities of the users, reducing size of content that results in a reduction of bandwidth and resources needed to handle them, thus saving power and resources. The reduction of the size of the content to be transmitted helps in efficient usage of the bandwidth and resources. Same can be done to store content on media thus reducing storage size, in turn saving storage resources and indirectly energy. Thus, saving energy and resources. For example, using various features of the system, a world knowledge library or a creativity center may be built. Such libraries may include accommodation centers and learning centers to gain knowledge from ancient times to modern times irrespective of the teachers and the audience being from different cultures and knowing different languages. Thereby, using the technology of the present disclosure, people from different regions can meet and communicate with each other irrespective of languages known, in verbal and/or written form.

Moreover, for legal investigations, people generally describe a person's facial features verbally and an artist draws the picture of that person as per the description. Such a conventional process is a time-consuming process. Moreover, if the description and the drawn picture do not match, the whole process needs to be repeated. Instead, the user device with a content conversion module provided in the present disclosure may be trained and used for converting the verbal description of a person into a picture of that person with enhanced accuracies and a faster approach. Furthermore, the device can be trained with the language of reading by touch and feel such that, using the device, a visually impaired person can read any book written in any language in his own language of touch and feel.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal-oxide-semiconductor (CMOS) based logic circuitry), firmware, software, and/or any combination of hardware, firmware, and/or software (for example, embodied in a machine-readable medium). For example, the systems and methods may be embodied using transistors, logic gates, and electrical circuits (for example, application-specific integrated circuit (ASIC) circuitry and/or in Digital Signal Processor (DSP) circuitry).

Particularly, the user device 110 and its various components may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations (for example, operations explained herein with reference to FIG. 5). A computer-readable medium storing, embodying, or encoded with a computer program, or similar language may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read-only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which, are disclosed.

Therefore, although the disclosure has been described based upon these exemplary embodiments, it is noted that certain modifications, variations, and alternative constructions may be apparent and well within the spirit and scope of the disclosure. Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
receiving, by a user device, a user input comprising one or more user preferences to facilitate at least one output content;
receiving, by the user device, at least one input content from at least one content source based on the one or more user preferences;
separating, by the user device, the at least one input content from the at least one content source into audio input, text input, and video input using delimiters, wherein the delimiters are static or dynamic, wherein the static delimiters are punctuation marks of human language and/or punctuation marks and tags of computer languages, and wherein dynamic delimiters are produced by artificially intelligent algorithms based on content and occurrence in the content;
generating, by the user device, the at least one output content from the at least one input content based on one or more content characteristics, wherein the at least one output content has data size less than the data size of the at least one input content, the one or more content characteristics accessed from a plurality of content-based library files for conversion of the at least one input content into the at least one output content, wherein the one or more content characteristics are audio characteristics, text characteristics, video characteristics, and language characteristics stored and accessed from the plurality of content-based library files; and
transmitting, by the user device, the at least one output content to another user device.

2. The method of claim 1, wherein generating the at least one output content comprises filtering out at least one content characteristic of the at least one input content using the plurality of content-based library files.

3. The method of claim 2, wherein the filtered out at least one characteristic is added at the other user device to regenerate the at least one input content of desired accuracy.

4. The method of claim 2, wherein the at least one content characteristic to be filtered out is predefined.

5. The method of claim 2, wherein the at least one content characteristic to be filtered out is dynamic and wherein information related to the filtered out at least one content characteristic is transmitted to the other user device before the transmission of at least one output content.

6. The method of claim 5, wherein the information related to the at least one content characteristic is included in an additional library file that is stored in a database, and wherein the additional library file is retrieved by the other user device for regeneration of the at least one input content.

7. The method of claim 1, wherein generating the at least one output content comprises converting the format of at least one input content to generate the at least one output content.

8. The method of claim 1, wherein generating the at least one output content comprises filtering out harmonic/frequency content from the at least one input content to generate the at least one output content, and wherein the filtered out content is added at the other user device with desired energy.

9. The method of claim 1, wherein generating the at least one output content comprises combining a plurality of colors in the at least one input content to form composite color content with a single color, and wherein transmitting the at least one output content comprises transmitting a composite color content signal to the other user device.

10. The method of claim 1, further comprising:
facilitating quality improvement of the at least one input content, the quality improvement facilitated by at least one content enhancer module based on the one or more content characteristics accessed from the plurality of content-based library files.

11. A user device, comprising:
an input/output (I/O) module configured to:
receive a user input comprising one or more user preferences to facilitate at least one output content;
a communication module configured to:
receive at least one input content from at least one content source based on the one or more user preferences; and
a processor in operative communication with the communication module and the I/O module, the processor configured to:
separate the at least one input content from the at least one content source into audio input, text input, and video input using delimiters, wherein the delimiters are static or dynamic, wherein the static delimiters are punctuation marks of human language and/or punctuation marks and tags of computer languages, and wherein dynamic delimiters are produced by artificially intelligent algorithms based on content and occurrence in the content, and
generate the at least one output content from the at least one input content based on one or more content characteristics, wherein the at least one output content has data size less than the data size of the at least one input content, the one or more content characteristics accessed from a plurality of content-based library files for conversion of the at least one input content into the at least one output content, wherein the one or more content characteristics are audio characteristics, text characteristics, video characteristics, and language characteristics stored and accessed from the plurality of content-based library files,
wherein the communication module is further configured to transmit the at least one output content to another user device.

12. The user device of claim 11, wherein the processor is configured to generate the at least one output content by filtering out at least one content characteristic of the at least one input content using the plurality of content-based library files.

13. The user device of claim 12, wherein the filtered out at least one characteristic is added at the other user device to regenerate the at least one input content of desired accuracy.

14. The user device of claim 12, wherein the at least one content characteristic to be filtered out is predefined.

15. The user device of claim 12, wherein the at least one content characteristic to be filtered out is dynamic, and wherein information related to the filtered out at least one content characteristic is transmitted to the other user device before transmission of the at least one output content.

16. The user device of claim 15, wherein the information related to the filtered out at least one content characteristic is included in an additional library file that is stored in a database, and wherein the additional library file is retrieved by the other user device for regeneration of the at least one input content.

17. The user device of claim 11, wherein the processor is configured to generate the at least one output content by converting the format of the at least one input content to generate the at least one output content.

18. The user device of claim 11, wherein the processor is configured to generate the at least one output content by filtering out harmonic/frequency content from the at least one input content to generate the at least one output content, and wherein the filtered out content is added at the other user device with desired energy.

19. The user device of claim 11, wherein the processor is configured to convert the plurality of content-based library files and/or content from a content source into a model form, and wherein the model form is stored and/or distributed for content conversion and content recreation.

20. A device, comprising:
an input module configured to:
receive a user input comprising one or more user preferences to facilitate at least one output content, and
receive at least one input content from at least one content source based on the one or more user preferences;
a processing module configured to:
separate the at least one input content from the at least one content source into audio input, text input, and video input using delimiters, wherein the delimiters are static or dynamic, wherein the static delimiters are punctuation marks of human language and/or punctuation marks and tags of computer languages, and wherein dynamic delimiters are produced by artificially intelligent algorithms based on content and occurrence in the content, and
generate the at least one output content from the at least one input content based on one or more content characteristics, wherein the at least one output content has data size less than the data size of the at least one input content, the one or more content characteristics accessed from a plurality of content-based library files for conversion of the at least one input content into the at least one output content, wherein the one or more content characteristics are audio characteristics, text characteristics, video characteristics, and language characteristics stored and accessed from the plurality of content-based library files; and
a transmitter configured to transmit the at least one output content to another user device, wherein the processing module is in communication with the input module and the transmitter.

* * * * *